United States Patent [19]
Lee et al.

[11] Patent Number: 5,377,287
[45] Date of Patent: Dec. 27, 1994

[54] FIBER OPTIC CORPORATE POWER DIVIDER/COMBINER AND METHOD

[75] Inventors: Jar J. Lee, Irvine; George I. Tsuda, Fullerton, both of Calif.

[73] Assignee: Hughes Aircraft Company, Los Angeles, Calif.

[21] Appl. No.: 811,591

[22] Filed: Dec. 19, 1991

[51] Int. Cl.$^5$ .............................................. G02B 6/32
[52] U.S. Cl. ......................................... 385/35; 385/31
[58] Field of Search ................... 385/35, 31; 359/741, 359/619

[56] References Cited

U.S. PATENT DOCUMENTS

| | | | |
|---|---|---|---|
| 4,230,941 | 10/1980 | Stauffer | 359/619 X |
| 4,516,832 | 5/1985 | Jain et al. | 385/33 |
| 4,722,582 | 2/1988 | Modone et al. | 385/35 |
| 5,085,977 | 2/1992 | Sugawara et al. | 359/619 X |

*Primary Examiner*—John D. Lee
*Assistant Examiner*—Stephen W. Barns
*Attorney, Agent, or Firm*—Wanda Denson-Low

[57] ABSTRACT

A fiber optic corporate power divider/combiner for use in fiber optic systems is provided. When functioning as an optical divider, the invention includes a dielectric lens for converting incoming optical energy from a divergent spherical wave to a plane wave. A micro-lens array in optical alignment with the dielectric lens functions to partition and focus the plane wave to provide a coherent phase optical dot pattern. A fiber bundle is provided to receive and uniformly distribute the coherent phase optical dot pattern. When functioning as an optical combiner, the invention includes the micro-lens array to convert an incoming coherent phase optical dot pattern from a plurality of divergent spherical waves to a plane wave. The dielectric lens optically aligned with the micro-lens array receives and converts the plane wave to a convergent spherical wave and a single optical fiber receives and transforms the convergent spherical wave into parallel rays for transmission. In a preferred embodiment, the dielectric lens comprises a single hyperbolic lens which is in juxtaposition to a plurality of hyperbolic lenses forming the micro-lens array. The number of lenses in the micro-lens array is equal to the number of optical fibers in the bundle for permitting optimum transmission of optical energy.

14 Claims, 2 Drawing Sheets

FIBER OPTIC CORPORATE POWER DIVIDER/COMBINER AND METHOD

BACKGROUND OF THE INVENTION

1. Field of the Invention

The present invention relates to fiber optical systems. More specifically, the present invention relates to methods and apparatus for distributing light in fiber optic systems.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Optical technology has been widely used in digital and radio frequency communication systems. A fiber optic distribution network can significantly increase channel capacity and reduce the weight and size requirements thereof. Fiber optic distribution networks typically include an optical power divider or combiner as a key component.

Optical power dividers/combiners couple light waves between distribution fibers and bundles of fibers. Light wave coupling systems commonly utilized in the past include series and parallel designs for transmitting optical information on an optical carrier. An example of a series light wave coupler is the series-fed, side-wall coupling device. This light wave power distribution device includes a series optical waveguide having a plurality of light tap points along the length of the waveguide. In practice, the optical energy is sequentially tapped off along the optical waveguide.

Because of the series design, the optical energy at the terminal end of the waveguide is dependent upon the optical energy at the entrance of the waveguide and the number of tap points therebetween. Further, the optical signal withdrawn from any particular one of the tap points is out of phase with that withdrawn from each of the other tap points. A phase delay between the tap points exists because there is typically a discrete time delay associated with the tapping of optical energy at each individual tap point due to the series design. As a result, the series-fed, side-wall coupling device produces optical output signals having uneven amplitude and phase due to attenuation and interaction along the tap points of the optical waveguide.

An example of a parallel light wave coupler includes a binary phase grating for star couplers. The grating may be formed from an orderly periodic pattern of scribes on one or both sides of a planar optical transmission medium. In either case, the gratings cause a scattering or diffusing of the light passed through or reflected from the transmission medium at periodic points. The light scattering creates diffusion patterns producing alternating bright and dark spots. An optical receiver, such as a fiber bundle, is typically positioned to intercept the bright spots.

Two binary phase gratings may be crossed at right angles to scatter a light beam into a two-dimensional diffraction pattern of grating lobes. The diffraction pattern of grating lobes are focused by a lens to form a dot pattern. The dot pattern is collectively determined by the periodic structure of the phase grating, the geometry of which must be carefully designed to achieve the desired grid pattern. Unfortunately, the rigid and complex design constrains the spacing and lattice structure of the fiber array. Further, the phase grating approach can not control the power distribution over the fiber array independently. Although this approach exhibits a corporate parallel structure, the phase grating approach relies on the scattering of and the recollection of light. Because of the collective effect of the gratings, there is no control over the resultant optical dot pattern. Thus, for any particular grating design, the resultant dot configuration is limited to, for example, a rectangular pattern. The resultant dot configuration can be modified by changing the orderly periodic pattern of nicks and scribes on the grating. Unfortunately, the resultant dot configuration is again limited by the modified periodic pattern on the grating.

Thus, there is a need in the art for an improvement in light wave coupling devices in conventional fiber optic systems.

SUMMARY OF THE INVENTION

The need in the art is addressed by the fiber optic corporate power divider/combiner of the present invention. When functioning as an optical divider, the invention includes a dielectric lens for converting incoming optical energy from a divergent spherical wave to a plane wave. A micro-lens array in optical alignment with the dielectric lens functions to partition and focus the plane wave to provide a coherent phase optical dot pattern. A fiber bundle is provided to receive and uniformly distribute the coherent phase optical dot pattern. When functioning as an optical combiner, the invention includes the micro-lens array to convert an incoming coherent phase optical dot pattern from a plurality of divergent spherical waves to a plane wave. The dielectric lens optically aligned with the micro-lens array receives and converts the plane wave to a convergent spherical wave and a single optical fiber receives and transforms the convergent spherical wave to parallel rays for transmission.

In a preferred embodiment, the dielectric lens comprises a single hyperbolic lens which is in juxtaposition to a plurality of hyperbolic lenses forming the micro-lens array. The number of lenses in the micro-lens array is equal to the number of fibers in the bundle for permitting optimum transmission of optical energy.

DESCRIPTION OF THE INVENTION

Figures 1A, 1B:
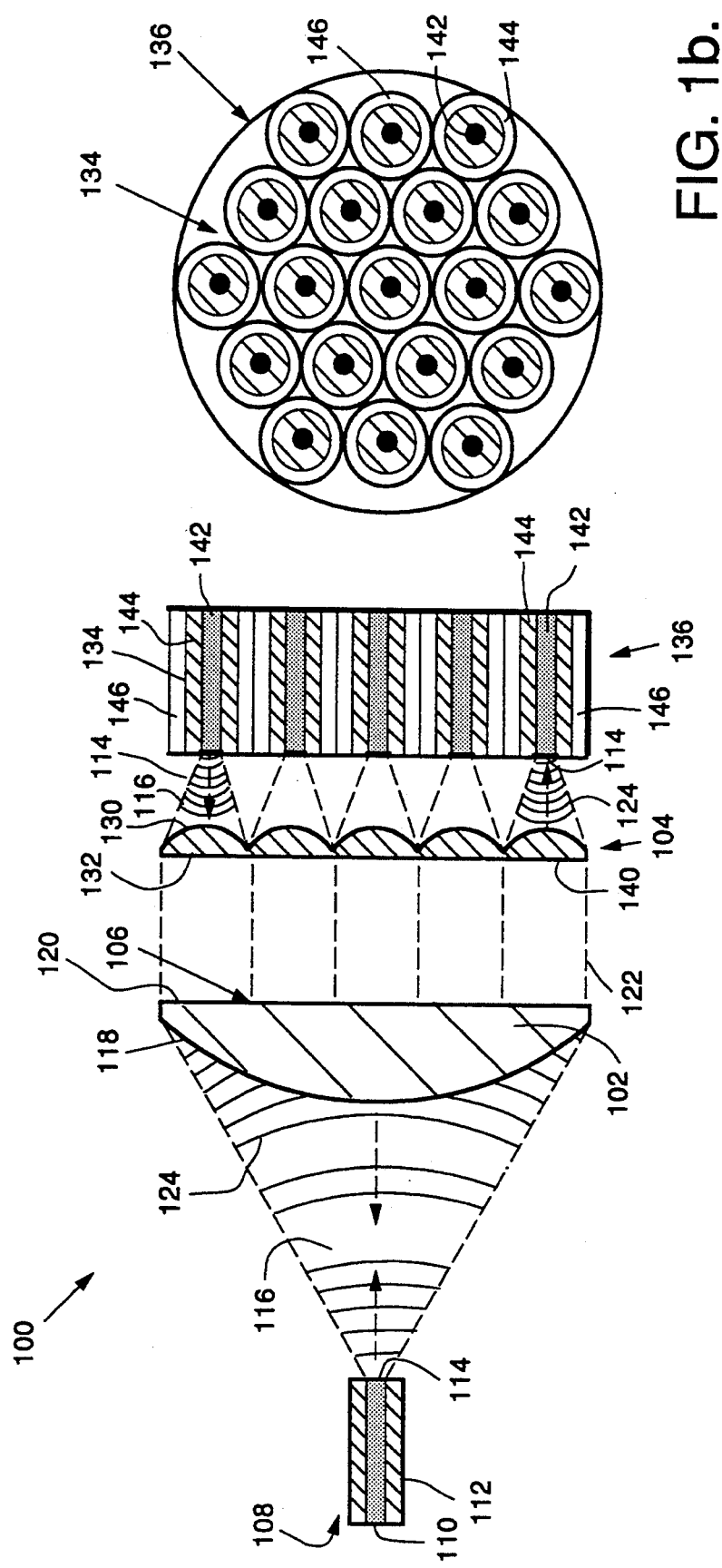
FIG. 1A is a cross-sectional view of an illustrative embodiment of the fiber optic corporate power divider/combiner of the present invention showing the main hyperbolic lens and a micro-lens array.
FIG. 1B is an end view of the fiber optic corporate power divider/combiner of FIG. 1A illustrating an exemplary configuration of the micro-lens array and the fiber bundle showing a uniform concentric arrangement.

As shown in FIG. 1A for purposes of illustration, the invention is embodied in a fiber optic corporate power divider/combiner 100 of the type having a hyperbolic lens 102 mounted in juxtaposition to a micro-lens array 104, each of which function to manipulate optical light beams for dividing or combining the light beams in fiber optic systems.

Optical power dividers/combiners are employed to couple light waves between distribution fibers. Known light wave coupling systems include series and parallel designs for transmitting optical information on an optical carrier. Series light wave couplers may include an optical waveguide having a plurality of light tap points along the length thereof for sequentially tapping off optical energy. The optical energy at the terminal end of the waveguide is dependent upon the optical energy at the terminal entrance and the number of tap points therebetween. Further, the optical energy withdrawn from the individual tap points is out of phase producing optical output signals having uneven amplitude and phase due to attenuation and interaction along the waveguide tap points. A parallel light wave coupler may include a binary phase grating for star couplers which produces a diffraction pattern of grating lobes of the transmitted light. The diffraction pattern is focused by a lens to form a dot pattern which is collectively determined by the periodic structure of the phase grating. The rigid and complex design of the phase grating constrains the spacing and lattice structure of the fiber array. Further, the phase grating approach can not control the power distribution over the fiber array independently and relies on the scattering of and the recollection of light. Because of the collective effect of the gratings, there is no control over the resulting light dot pattern, the resultant configuration being limited to, for example, a rectangular pattern.

In accordance with FIG. 1A of the present invention, the hyperbolic lens 102 and the micro-lens array 104 of the optical divider/combiner 100 cooperate to partition the aperture 106 to create any desirable grid pattern with each grid dot independently formed and to provide even amplitudes and path lengths, and hence coherent phase of the modulating signal at all optical outputs. Moreover, the divider/combiner 100 provides a flexible lattice structure and a straight forward lens design and controls the power distribution independently by varying the capture area of each micro-lens 107 in the array 104.

The corporate (tree-type) optical power divider/combiner 100 of the present invention is essentially a parallel structure of fibers utilized to couple light waves between one fiber and "N" fibers in a bundle. A single optical fiber 108 is shown in optical communication with the hyperbolic lens 102 in FIG. 1A. The optical fiber 108 includes a core 110 which functions as an optical waveguide for the optical energy or signal. The core 110 preferably has a high index of refraction "n" which is defined as the velocity of light in free space ($C_o$) divided by the velocity of light in a dielectric material ($C_{in}$) as follows:

$$n = C_o/C_{in} \qquad [1]$$

The core 110 is surrounded by a cladding 112 which is utilized to keep the optical energy from escaping and can be another layer of glass having a low dielectric constant. It is the large change in dielectric constant between the core 110 and the cladding 112 which prevents the optical energy from crossing the interface between the core and the cladding.

The single optical fiber 108 disclosed in FIG. 1A, like each of the other optical fibers described hereinafter, includes a concave spherical end 114 formed on the core 110. In general, the concave spherical end 114 causes the transmitted light beams to diverge. When the divider/combiner 100 functions as a divider, the single optical fiber 108 serves as an input terminal for the optical energy. When the single optical fiber 108 functions as an input terminal, the light beams expand into a divergent spherical wave 116 onto the hyperbolic lens 102. However, when the divider/combiner 100 functions as a combiner, the single optical fiber 108 serves as an output terminal and the concave spherical end 114 serves to receive and transform a convergent spherical wave from the hyperbolic lens 102 into parallel rays.

Figure 1C:
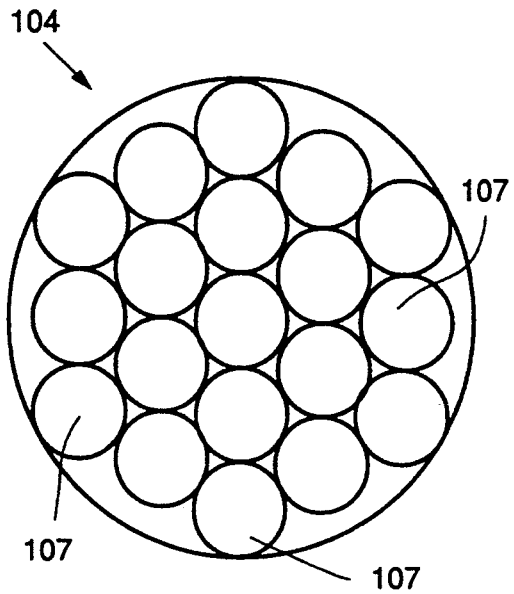
FIG. 1C is a front elevational view of the micro-lens array illustrated in FIG. 1A showing nineteen micro-lenses arranged in a triangular lattice configuration.
Figure 1D:
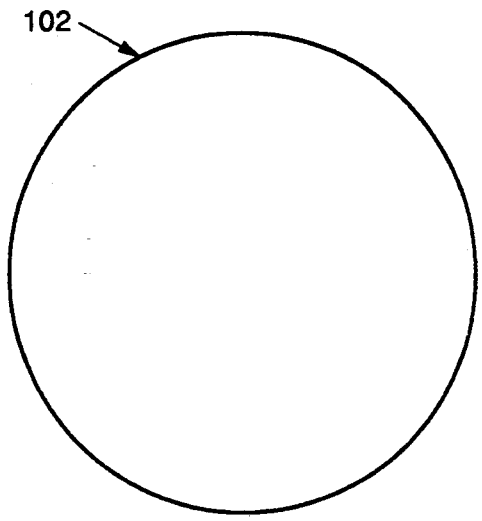
FIG. 1D is a front elevational view of the main hyperbolic lens illustrated in FIG. 1A.

The hyperbolic lens 102 is a dielectric lens having a curved side 118 and a flat side 120 as shown in FIGS. 1A and 1D. The curved side 118 has a hyperbolic contour and the flat side 120 functions as the aperture 106 of the hyperbolic lens 102. When functioning as a divider, the curved side 118 of the hyperbolic lens 102 transforms the divergent spherical wave 116 into a plane wave 122. After the correction, the plane wave 122 includes a plurality of parallel light rays each equally delayed in time. However, when in the combiner mode, the lens 102 serves to transform the parallel rays of the plane wave 122 into a convergent spherical wave 124 for receipt by the single optical fiber 110 as shown in FIG. 1A.

Figure 3:
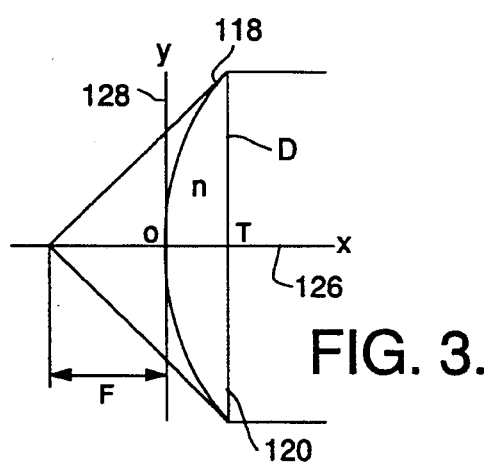
FIG. 3 is a graphical representation illustrating the coordinates of an exemplary hyperbolic lens suitable for use in the fiber optic corporate power divider/combiner of FIG. 1A.

A graphical description of the hyperbolic lens 102 appears in FIG. 3. The lens 102 is depicted as having the curved side 118 and the flat side 120. Passing through the center of the curved and flat-sides is a central ray "x" designated as the center axis 126. Further, a ray "y" designated as line 128 is tangent to the curved surface 118 and intersecting the center axis 126 at the point "o." The point "o" defines the vertex of the hyperbolic lens 102. The center thickness of the lens 102 is defined by the distance "oT" shown in FIG. 3 while the diameter of the lens 102 is equivalent to the length of the flat side 120 and designated by the letter "D". The distance "F" is the focal length of the hyperbolic lens 102 to the single optical fiber 108. With "n" being defined as the index of refraction in equation [1], the dielectric constant ($\epsilon$) is equal to:

$$\epsilon = n^2 \qquad [2]$$

so that the index of refraction "n" may also be defined as $(\epsilon)^{\frac{1}{2}}$.

The hyperbolic lens 102 is one of the simplest dielectric lens that can be utilized to transform the divergent spherical wave 116 into the plane wave 122 and, conversely, focus the plane wave 122 onto a point or dot. The surface contour of the hyperbolic lens 102 shown in FIG. 3 is given by the following equation:

$$y=[(n^2-1)(x-F)^2+2(n-1)F(x-F)]^{\frac{1}{2}} \quad [3]$$

where the parameters y, n, x and F are as defined above. For a given diameter "D" dielectric constant "n", and focal length "F" the center thickness "oT" of the hyperbolic lens 102 is determined by:

$$oT=[\{F^2+(n+1)D^2/4(n-1)\}^{\frac{1}{2}}-F]/(n+1) \quad [4]$$

This expression can be solved for any one of the parameters in terms of the other parameters.

Each micro-lens 107 of the micro-lens array 104 is also a hyperbolic lens having a curved surface 130 and a flat surface 132 identical to the main hyperbolic lens 102. The flat surface 132 of each of the micro-lenses 107 of the micro-lens array 104 faces the flat surface 120 of the hyperbolic lens 102 in a back-to-back manner. The distance between the hyperbolic lens 102 and the micro-lens array 104 in FIG. 1A is exaggerated to show the parallel rays of the plane wave 122. In practice, the two elements are merged together but also may have some finite distance therebetween. Whether the lens 102 and the lenses 107 of the array 104 are fused together or separated is not critical. This location is convenient for introducing a constant path length offset such as a delay which is common to every parallel ray.

The number of micro-lenses 107 in the array 104 shown in FIG. 1A must be the same as the number of optical fibers 134 in a fiber bundle 136 shown in FIGS. 1A and 1B. The equivalency in the number of micro-lenses 107 to the number of fibers 134 ensures a high optical coupling efficiency. Therefore, the configuration of the micro-lenses 107 in the array 104 is dictated by the configuration of optical fibers 134 in the fiber bundle 136. A suitable configuration of the fiber bundle 136 shown as an end view in FIG. 1B dictates the configuration of the micro-lenses 107 of the micro-lens array 104 shown in FIG. 1C. Thus, if a center-positioned vertical cross-sectional view were taken of the end view of the fiber bundle 136, the five micro-lenses 107 of the array 104 and the five optical fibers 134 would appear as shown in FIG. 1A.

The function of the micro-lens array 104 is to produce a desired dot pattern to couple the light plane wave 122 from the hyperbolic lens 102 into the optical fibers 134 of the fiber bundle 136. The micro-lens array 104 can be designed to provide appropriate partitioning of the aperture 106 to create any desirable grid pattern of dots. The dots are each independently formed from the partitioned light waves and are focused onto the individual optical fibers 134 for light distribution. Further, the lattice structure of the micro-lens array 104 is flexible and the design of the micro-lenses 107 is straight forward. Additionally, by varying the size or capture area of each micro-lens 107, the energy distribution over the fiber bundle 136 can be controlled independently.

Since the plane wave 122 enters the flat surface 132, each of the micro-lenses 107 of the array 104 functions to converge the local light rays of that portion of the partitioned plane wave 122 into a dot. Each dot is independently focused onto the corresponding optical fiber 134 appropriately positioned within the fiber bundle 136. In this manner, the desired dot pattern is created that corresponds to the configuration of the fiber bundle 136 for the distribution of the light waves in a fiber optical system. Each of the independently focused dots in the desired pattern contain the same optical information as the original divergent spherical wave 116. However, the intensity of the optical energy contained in each dot is decreased in proportion to the divider ratio that is controlled by the construction of the divider/combiner 100. Thus, the size and location of the micro-lens array 104 controls the intensity of the optical energy in each dot.

Due to the intrinsic Gaussian beam characteristics at the input of the divider/combiner 100, the optical divider exhibits a Gaussian (bell shaped) power distribution over the micro-lens array aperture 140 in the radial direction. The Gaussian power distribution causes the light to be bright at the center and dark at the edges indicating that the power distribution is non-uniform. The light energy, in effect, tapers off at the edges. Thus, the intensity of the optical energy in the centrally located dots of the pattern, and consequently in the central fibers, is higher than the intensity of the optical energy in the outer dots of the pattern and in outer fibers.

Figure 2:
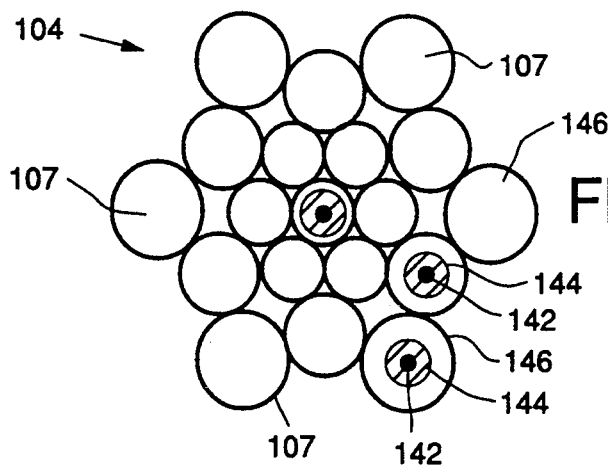
FIG. 2 is an end view of the fiber optic corporate power divider/combiner of FIG. 1A illustrating another exemplary configuration of the micro-lens array and the fiber bundle partially superimposed thereon showing a concentric arrangement of different size micro-lenses to offset radial power taper caused by non-uniform power density.

For some applications, it may be desirable to have a uniform distribution for all "N" outputs of the micro-lens array 104. In this case, the micro-lenses 107 can be arranged in concentric rings as shown in FIG. 2. Note that several of the optical fibers 134 of the fiber bundle 136 are superimposed upon the configuration of the micro-lens array 104 in FIG. 2 for illustration purposes. The micro-lenses 107 shown in FIG. 2 are arranged with the outer rings consisting of larger lenses to offset the power taper. The light capture area of each micro-lens 107 determines the amount of energy to be coupled into an optical fiber 134 of the fiber bundle 136. Thus, the outer micro-lenses 107 are made progressively larger to capture more light energy to equalize the power distribution and to exhibit an intensity equivalent to that of the centrally located micro-lenses 107. Thus, more light energy is focused onto the corresponding outer optical fibers 134 to provide a desired dot pattern having an approximate uniform distribution.

Various other arrangements for the micro-lenses 107 are possible for providing an appropriate partitioning of the plane wave received from the hyperbolic lens 102. For example, a large micro-lens could be surrounded by a ring of smaller micro-lenses. The large micro-lens would capture more light and focus a stronger output on one particular dot. Other large micro-lenses integrated into the arrangement would focus proportional amounts of light onto specified areas of the fiber bundle 136 commensurate with the amount of light energy captured. Likewise, smaller micro-lenses which capture less light energy would focus less light energy onto the fiber bundle 136.

It is understood that the configuration of the fiber bundle 136 corresponds to the selected configuration of the micro-lens array 104. In practice, the fiber bundle lattice can be arranged in any form to fit a desired configuration or power distribution in the optical divider/combiner 100 of the present invention. However, the fibers 134 can be rearranged as desired downstream from the coupling device for economic distribution. In FIG. 1B, the optical fibers 134 are arranged in a triangular lattice to correspond to the configuration of the micro-lens array 104. Each of the optical fibers 134 of the fiber bundle 136 is shown having a center core 142 and a glass cladding 144 very similar to that described with reference to the single optical fiber 108. The diameters of the center core 142 and the cladding 144 are very small. Therefore, a spacer sleeve 146 comprised of, for example, another layer of glass, is employed to surround each optical fiber 134 to maintain the fiber in position within the bundle 136 as shown in FIG. 1B. Spacer sleeves may also be utilized within the micro-lens array 104 to preserve alignment and spacing of the focal point of each micro-lens 107 with the corresponding fiber 134 within the bundle 136.

The concentric configuration of the micro-lens array 104 shown in FIG. 2 and mentioned above also applies to the corresponding configuration of the fiber bundle 136. If FIG. 2 represents the configuration of the micro-lens array 104, then it also necessarily represents the configuration of the fiber bundle 136. When FIG. 2 represents the configuration of the micro-lens array 104, the progressively larger concentric circles indicate the circumference of the larger micro-lenses 107. However, when the superimposed portion of FIG. 2 represents the configuration of the fiber bundle 136, the progressively larger concentric circles indicate the position of the spacer sleeve 146 surrounding the glass cladding 144 of each optical fiber 134. The glass cladding 144, in turn, encapsulates the center core 142 in the same manner as described with reference to FIG. 1B. It is noted that the size of the optical fibers 134 (center core 142 and cladding 144) in FIG. 2 remain the same as those shown in FIGS. 1A and 1B. However, for general illustration purposes, the spacer sleeves 146 are adjusted for larger outer concentric rings designed to offset the radial power taper. In FIG. 2, the spacer sleeves 146 are utilized to permit the focal points of the individual micro-lenses 107 to be aligned with a corresponding configuration of optical fibers 134 of the fiber bundle 136.

When the divider/combiner 100 functions in the combiner mode, each of the optical fibers 134 forming the dot pattern of the fiber bundle 136 transmits optical energy of low intensity to the corresponding lens of the micro-lens array 104. Each fiber 134 transmits optical energy containing the same optical information. After the optical energy of each of the individual fibers 134 has been combined, the intensity of the optical energy in the single optical fiber 108 increases. Whether the divider/combiner 100 is functioning as a divider or a combiner, optical phasing problems are eliminated in the following manner. The flat side 120 of the hyperbolic lens 102 and the flat side 132 of each of the lenses 107 of the micro-lens array 104 provides an equal phase plane as is known in the art. Thus, any position along the flat sides 120 and 132 of the lenses transmits light having the same optical phase independent of frequency (e.g., color). Therefore, by positioning the flat side 120 of the hyperbolic lens 102 to face the flat side 132 of each lens 107 of the micro-lens array 104 and by selecting each of the lenses 107 of the micro-lens array 104 to be the same size, each of the light beams will be in phase.

The above-described method for eliminating optical phasing problems by utilizing equally sized micro-lenses 107 is tailored to the construction of the preferred embodiment illustrated in FIG. 1B. When lenses employed in the micro-lens array 104 are of varying sizes as is illustrated in FIG. 2, optical phasing problems exist. Under these conditions, compensation is required. To compensate for the differences in optical path lengths caused by different sizes of micro-lenses 107, the dielectric constant of the smaller lenses of the micro-lens array 104 can be modified. The extent of the required dielectric constant modification is determined by the amount of phase difference introduced by the different sized lenses. Further, the focal length "F" of each micro-lens 107 can be made the same by designing the larger micro-lenses 107 to focus on the same plane as the smaller micro-lenses 107. Additionally, the length of the optical fibers 134 associated with the larger micro-lenses 107 can be decreased to equalize the output phases of the optical energy between the fibers. The shorter fibers will offset the delay of the optical signal from the larger micro-lens 107 compensating for the shorter focal lengths associated with smaller micro-lenses 107. Thus, the output phase of the distributed optical energy equalizes.

Compensation by any of these methods is difficult. Therefore, a major advantage of the present invention as shown in FIG. 1B is the utilization of equally sized lenses 107 in the micro-lens array 104. The naturally occurring taper in the intensity of the optical energy in the outer lenses of the equally sized lens embodiment of FIG. 1B minimizes the side lobes as normally required by typical RADAR applications.

Figure 4:
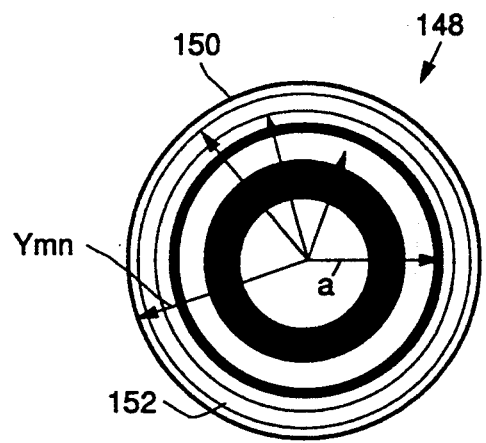
FIG. 4 is a planar view of a Fresnel zone plate illustrating the concentric construction and radii thereof which is suitable for use in fabricating the main hyperbolic lens or the micro-lens array of the present invention.

The plurality of micro-lenses 107 comprising the micro-lens array 104 can be fabricated, polished and positioned individually. The hyperbolic lens 102 may be comprised of, for example, glass, quartz or teflon. Other types of lens configurations, of course, may also be used and can be selected by those skilled in the art familiar with lens design. Although the present invention is not directed to fabricating the lens system, it is useful to disclose a photographic technique to achieve the lens system, e.g., a technique that approximates the same optical effect as the lens configuration disclosed in FIG. 3. It is known that a Fresnel zone plate 148, plate 148, which was invented by Lord Rayleigh and is shown in FIG. 4, acts much like a lens. A zone plate 148 can be easily fabricated, in practice, by drawing concentric circles 150 in dark ink upon a transparent film 152. The darkened concentric circles 150 and the spaces therebetween form zones on the zone plate 148. Every other zone is darkened to create an interference pattern which serves to converge the light waves to one spot. The magnitude of the radii of the concentric circles 150 are proportional to the square roots of the integer numbers of the zones of interest. The pattern is then photographically reduced to the proper scale.

The printing process on the optical transparent film 152 produces a pattern which provides the same optical effect of transforming light waves from one form to another as does a transparent dielectric lens. The Fresnel zone plate 148 shown in FIG. 4 has a focal length that is related to the radius "a" of the first zone as follows:

$$F = a^2/\lambda \qquad [5]$$

where $\lambda$ is the wavelength of the light being transmitted. The radii of the remaining zones within the Fresnel zone plate 148 are provided by the expression:

$$r_m = (m)^{\frac{1}{2}} \times (a) \qquad [6]$$

where "m" is equal to the integer number of the concentric circle 150 (e.g., m = 2, 3, 4, etc.) counting the concentric circles from inside out. In practice, fabrication is accomplished so that the hyperbolic lens 102 and all the micro-lenses 107 in the array 104 can be replaced by zone plates 148 printed on one transparent film 152.

In the exemplary embodiments shown in FIGS. 1A, 1C and 2, nineteen micro-zone plates 148 are required to replace the micro-lenses 107 in the array 104 and a single zone plate is required for the hyperbolic lens 102. The nineteen separate micro-zone plates 148 are substituted for the entire micro-lens array 104 and the requirement of grinding and polishing nineteen separate lens surfaces is eliminated. The same situation applies to the hyperbolic lens 102. In the divider mode, the function of each of the nineteen micro-zone plates 148, as with the micro-lenses 107, is to focus a portion of the plane wave 122 onto the individual optical fibers 134. This is accomplished by converting that portion of the plane wave 122 into a convergent spherical wave 124 as shown in FIG. 1A. In the combiner mode, the function of each of the nineteen micro-zone plates 148 is to transform a divergent spherical wave 116 from one of the individual optical fibers 134 to the plane wave 122 for transmission to the hyperbolic lens 102. Thus, the photographic technique involving the Fresnel zone plate is suitable for fabricating both the main hyperbolic lens 102 and the individual micro-lenses 107 of the micro-lens array 104.

Finally, it should be noted that to improve the coupling efficiency, the end of each optical fiber 134 must be treated to have a concave spherical surface or end 114. The concave spherical surface or end 114 acts like a lens which diffuses the light wave from the optical fiber 134 into a spherical wave. Conversely, the concave spherical surface or end 114 transforms a convergent beam into parallel rays within the optical fiber 134.

When functioning as a divider, a light wave is directed to the hyperbolic lens 102 from the single optical fiber 108. The concave spherical end 114 of the single fiber 108 transforms the parallel rays within the fiber 108 into a divergent spherical wave 116. The lens 102 transforms the divergent spherical wave 116 into a plane wave 122 having parallel rays. The plane wave 122 is then converted into a plurality of lower intensity convergent spherical waves 124 via the micro-lens array 104 for focusing onto the optical fibers 134 of the optical bundle 136. The concave spherical ends 114 of the fibers 134 transform the plurality of convergent spherical waves 124 into parallel rays for distribution.

When functioning as a combiner, the parallel rays within the fibers 134 are transformed into a plurality of individual low intensity divergent spherical waves 116 by the concave spherical ends 114 of the fibers. The plurality of divergent spherical waves are combined into a higher intensity single plane wave 122 by the plurality of micro-lenses 107. The plane wave 122 impinges upon and is transformed into a single convergent wave 124 by the hyperbolic lens 102. The single convergent spherical wave 124 is then transformed into parallel rays for distribution by the concave spherical end 114 of the single optical fiber 108.

A corporate (tree-type) optical power divider/combiner 100 has been disclosed which is employed to couple a light wave from one fiber to "N" fibers and, in the reciprocating mode, to couple light waves from "N" fibers to one fiber. The optical divider/combiner 100 is a key element of all fiber optic distribution networks. The reciprocal star coupler of the present invention provides even amplitudes and equal path lengths. Hence, coherent phase of the modulating signal is provided at all optical outputs because each fiber 134 in the bundle 136 experiences a common modulation signal delay. Thus, whatever modulation exists at the point source is also experienced in all the fibers 134 of the bundle 136. The divider/combiner 100 utilizes a micro-lens array 104 which partitions the aperture 106 to create any desirable grid pattern with each grid dot independently formed. The present invention independently controls the light energy distribution over the fiber bundle 136 by varying the capture area of each micro-lens 107 and thus provides a high quality divider with a high split ratio.

The optical divider/combiner 100 is applicable in RADAR and communication applications. Generally, in RADAR applications, the use of equally sized lenses in the micro-lens array 104 permits the exploitation of the natural taper of the optical energy intensity for eliminating undesirable side lobes. The present invention is useful in phased arrays in which equal line lengths are required to produce a uniform wavefront to collimate a light beam. The divider/combiner 100 is further useful in phased array applications since all radiating points must radiate simultaneously to avoid performance problems with the collimated beam. Other applications are evident in signal communication distribution. Examples include a situation in which a single beam must be divided into multiple beams (e.g., closed circuit television signal or telephone signals distributed to a housing tract) or a situation in which multiple signals must be converged into a single beam (e.g., multiplexing multiple telephone signal lines into a central switching office). It is evident that the optical divider/combiner 100 of the present invention is very flexible compared to other optical star couplers of the prior art. The present invention can also be used for two-dimensional arrays by forming the lenses in a linear (rectangular) lattice.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such modifications, applications and embodiments within the scope of the present invention.

Accordingly,

What is claimed is:

1. An optical divider comprising:
   dielectric lens means for converting incoming optical energy from a divergent spherical wave to a plane wave;
   micro-lens means in optical alignment with said dielectric lens means for partitioning and focusing said plane wave to provide a coherent phase optical dot pattern; and
   means for receiving and uniformly distributing said coherent phase optical dot pattern;
   wherein said micro-lens means comprises a plurality of concentrically positioned micro-lenses with the outer concentric lenses being larger than the inner concentric lenses to compensate for non-uniform optical power density.

2. The optical divider of claim 1 wherein said dielectric lens means comprises a hyperbolic lens.

3. The optical divider of claim 2 wherein said hyperbolic lens includes a hyperbolic surface on a first side and a flat surface on a second side.

4. The optical divider of claim 1 wherein said micro-lens means comprises a micro-lens array.

5. The optical divider of claim 4 wherein said micro-lens array comprises a plurality of equally sized hyperbolic lenses each having a hyperbolic surface on a first side and a flat surface on a second side.

6. The optical divider of claim 1 wherein said optical fiber means includes a concave spherical end to diverge said optical energy.

7. The optical divider of claim 1 wherein said receiving and distributing means comprises a bundle of optical fibers.

8. An optical combiner comprising:
micro-lens means for converting an incoming coherent phase optical dot pattern from a plurality of divergent spherical waves to a plane wave;
dielectric lens means in optical alignment with said micro-lens means to receive and convert said plane wave to a convergent spherical wave; and
means for receiving and transmitting said convergent spherical wave;
wherein said micro-lens means comprises a plurality of concentrically positioned micro-lenses with the outer concentric lenses being larger than the inner concentric lenses to compensate for non-uniform optical power density.

9. The optical combiner of claim 8 wherein said micro-lens means comprises a micro-lens array.

10. The optical combiner of claim 9 wherein said micro-lens array comprises a plurality of equally sized hyperbolic lenses each having a hyperbolic surface on a first side and a flat surface on a second side.

11. The optical combiner of claim 8 wherein said dielectric lens means comprises a hyperbolic lens.

12. The optical combiner of claim 11 wherein said hyperbolic lens includes a hyperbolic surface on a first side and a flat surface on a second side.

13. The optical combiner of claim 8 wherein each fiber of said bundle of optical fibers includes a concave spherical end to diverge the optical energy of said coherent phase optical dot pattern.

14. The optical combiner of claim 8 wherein said receiving and transmitting means comprises an optical fiber.

* * * * *